United States Patent
Lim

(10) Patent No.: US 9,294,976 B2
(45) Date of Patent: Mar. 22, 2016

(54) METHOD FOR TRANSCEIVING A SIGNAL TO/FROM A MOBILE FEMTOCELL IN A WIRELESS COMMUNICATION SYSTEM, AND APPARATUS FOR SAME

(75) Inventor: Jaewon Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 216 days.

(21) Appl. No.: 13/805,447

(22) PCT Filed: Jul. 1, 2011

(86) PCT No.: PCT/KR2011/004840
§ 371 (c)(1),
(2), (4) Date: Dec. 19, 2012

(87) PCT Pub. No.: WO2012/002766
PCT Pub. Date: Jan. 5, 2012

(65) Prior Publication Data
US 2013/0089075 A1    Apr. 11, 2013

Related U.S. Application Data

(60) Provisional application No. 61/360,882, filed on Jul. 1, 2010.

(51) Int. Cl.
*H04L 12/28* (2006.01)
*H04W 36/08* (2009.01)
*H04W 36/04* (2009.01)
*H04J 1/16* (2006.01)
*H04W 84/04* (2009.01)

(52) U.S. Cl.
CPC .............. *H04W 36/08* (2013.01); *H04W 36/04* (2013.01); *H04W 84/045* (2013.01)

(58) Field of Classification Search
CPC .................................................... H04W 84/045
USPC .................................. 370/252, 329, 386, 278
See application file for complete search history.

(56) References Cited

U.S. PATENT DOCUMENTS

2008/0153497 A1* 6/2008 Kalhan ........................ 455/436
2009/0310568 A1* 12/2009 Chen et al. .................... 370/332
(Continued)

FOREIGN PATENT DOCUMENTS

KR    10-2010-0046492        5/2010

OTHER PUBLICATIONS

Ioannis Papapanagiotou, et al., "A Survey on Next Generation Mobile WiMAX Networks: Objectives, Features and Technology Challenges", IEEE Communications Survey & Tutorials 2009, vol. 11, No. 4, 16 pages (Relevant section: IV.C.3).
(Continued)

*Primary Examiner* — John Pezzlo
(74) *Attorney, Agent, or Firm* — Lee, Hong, Degerman, Kang & Waimey

(57) ABSTRACT

The present application relates to a method in which a terminal processes a signal in a wireless communication system in which communication between the terminal and a mobile femtocell is being performed via a first communication link. More particularly, the method comprises the following steps: disconnecting the first communication link and establishing a second communication link to a neighbor cell in the event the terminal and the mobile femtocell enter the coverage area of the neighbor cell; delivering information, relating to the first communication link, to the mobile femtocell during communication with the neighbor cell, performed via the second communication link; and reestablishing the first communication link to the mobile femtocell on the basis of the information relating to the first communication link in the event the mobile femtocell and the terminal leave the coverage area of the neighbor cell.

6 Claims, 12 Drawing Sheets

(56) References Cited

U.S. PATENT DOCUMENTS

| | | | |
|---|---|---|---|
| 2010/0130212 A1 | 5/2010 | So et al. | |
| 2010/0234071 A1* | 9/2010 | Shabtay et al. | 455/562.1 |
| 2011/0211444 A1* | 9/2011 | Das et al. | 370/219 |
| 2011/0217947 A1* | 9/2011 | Czaja et al. | 455/404.1 |
| 2011/0244870 A1* | 10/2011 | Lee | 455/444 |
| 2012/0069802 A1* | 3/2012 | Chen | H04L 5/001 370/329 |

OTHER PUBLICATIONS

Semin Sim, et al., "Seamless IP Mobility Support for Flat Architecture Mobile WiMAX Networks", IEEE Communications Magazine, Jun. 2009, 7 pages.

PCT International Application No. PCT/KR2011/004840, Written Opinion of the International Searching Authority dated Feb. 23, 2012, 16 pages.

\* cited by examiner (a) control plane protocol stack (b) user plane protocol stack

METHOD FOR TRANSCEIVING A SIGNAL TO/FROM A MOBILE FEMTOCELL IN A WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2011/004840, filed on Jul. 1, 2011, which claims the benefit of U.S. Provisional Application Ser. No. 61/360,882, filed on Jul. 1, 2010, the contents of which are hereby incorporated by reference herein in their entirety.

TECHNICAL FIELD

The present invention relates to a wireless communication system, and more particularly, to a method for transmitting/receiving a signal to/from a mobile femtocell in a wireless communication system and apparatus for the same.

BACKGROUND ART

3GPP LTE ($3^{rd}$ generation partnership project long term evolution) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, on the basis of the discussion mentioned in the above, the present invention intends to propose a method of transmitting/receiving a signal to/from a mobile femtocell in a wireless communication system and apparatus for the same.

Technical Solution

To achieve these and other advantages and in accordance with the purpose of the present invention, as embodied and broadly described, a method of processing a signal, which is processed by a user equipment in a wireless communication system having a mobile femtocell currently communicate with the user equipment via a $1^{st}$ communication link may include the steps of if the user equipment and the mobile femtocell enter a coverage of an adjacent cell, establishing a $2^{nd}$ communication link with the adjacent cell by disconnecting the $1^{st}$ communication link, delivering a $1^{st}$ communication link related information to the mobile femtocell while communicating with the adjacent cell via the $2^{nd}$ communication link, and if the mobile femtocell and the user equipment leave the coverage of the adjacent cell, re-establishing the $1^{st}$ communication link with the mobile femtocell based on the $1^{st}$ communication link related information. In particular, in case of establishing the $2^{nd}$ communication link with the adjacent cell, the mobile femtocell is set to an anchor cell.

Preferably, the $1^{st}$ communication link re-establishing step may include the step of sending a $1^{st}$ communication link re-establishment request message to the user equipment from the mobile femtocell.

In particular, the $1^{st}$ communication link re-establishing step may include the step of sending the $1^{st}$ communication link re-establishment request message to the user equipment from the mobile femtocell, sending the $1^{st}$ communication link re-establishment request message to the mobile femtocell from the user equipment, or sending the $1^{st}$ communication link re-establishment request message to the mobile femtocell from the adjacent cell.

More preferably, the $1^{st}$ communication link related information delivering step may include the steps of establishing a $3^{rd}$ communication link with the mobile femtocell and delivering the $1^{st}$ communication link related information via the $3^{rd}$ communication link. In particular, the $3^{rd}$ communication link may comprise a WPAN (wireless personal access network) communication link.

More preferably, in case that the user equipment establishes the $2^{nd}$ communication link with the adjacent cell, the mobile femtocell makes a transition to an idle state.

More preferably, the 1$^{st}$ communication link related information may have at least one selected from the group consisting of a security information of the user equipment, a subscription information of the user equipment, a capability information of the user equipment, an information on resource assigned to the user equipment, an operational state for a service managed by the user equipment and QoS information, and a network address information of the user equipment.

To further achieve these and other advantages and in accordance with the purpose of the present invention, a user equipment device in a wireless communication system having a mobile femtocell currently communicate with the user equipment device via a 1$^{st}$ communication link, according to another embodiment of the present invention may include an RF (radio frequency) module configured to transceive signals with a communication link established cell and a processor configured to control the RF module and configured to process the signals. If the user equipment and the mobile femtocell enter a coverage of an adjacent cell, the processor is configured to establish a 2$^{nd}$ communication link with the adjacent cell by disconnecting the 1$^{st}$ communication link and deliver a 1$^{st}$ communication link related information to the mobile femtocell while communicating with the adjacent cell via the 2$^{nd}$ communication link. If the mobile femtocell and the user equipment leave the coverage of the adjacent cell, the processor is configured to re-establish a 1$^{st}$ communication link with the mobile femtocell based on the 1$^{st}$ communication link related information. Preferably, in case of establishing the 2$^{nd}$ communication link with the adjacent cell, the mobile femtocell is set to an anchor cell.

In particular, the re-establishment of the 1$^{st}$ communication link may be triggered in a manner that the mobile femtocell sends a 1$^{st}$ communication link re-establishment request message to the user equipment device, may be triggered in a manner that the user equipment device sends a 1$^{st}$ communication link re-establishment request message to the mobile femtocell, or may be triggered in a manner that the adjacent cell sends a 1$^{st}$ communication link re-establishment request message to the mobile femtocell.

Preferably, the processor may establish a 3$^{rd}$ communication link with the mobile femtocell and may be able to deliver the 1$^{st}$ communication link related information via the 3$^{rd}$ communication link. In particular, the 3$^{rd}$ communication link may comprise a WPAN (wireless personal access network) communication link.

In particular, if the user equipment device establishes the 2$^{nd}$ communication link with the adjacent cell, the mobile femtocell makes a transition to an idle state. Moreover, the 1$^{st}$ communication link related information may have at least one selected from the group consisting of a security information of the user equipment device, a subscription information of the user equipment device, a capability information of the user equipment device, a resource information allocated to the user equipment device, an operational state for a service managed by the user equipment device and a QoS (quality of service) information, and a network address information of the user equipment device.

Advantageous Effects

According to various embodiments of the present invention, a user equipment device may be able to efficiently perform a fast re-access to a mobile femtocell in a wireless communication system.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
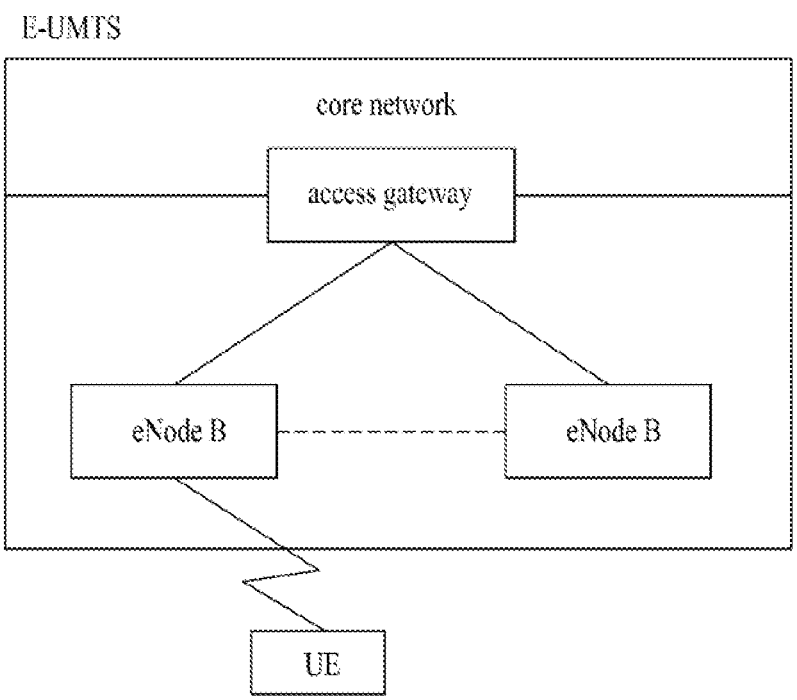
FIG. 1 is a schematic diagram of E-UMTS network structure as one example of a wireless communication system.
Figure 2:
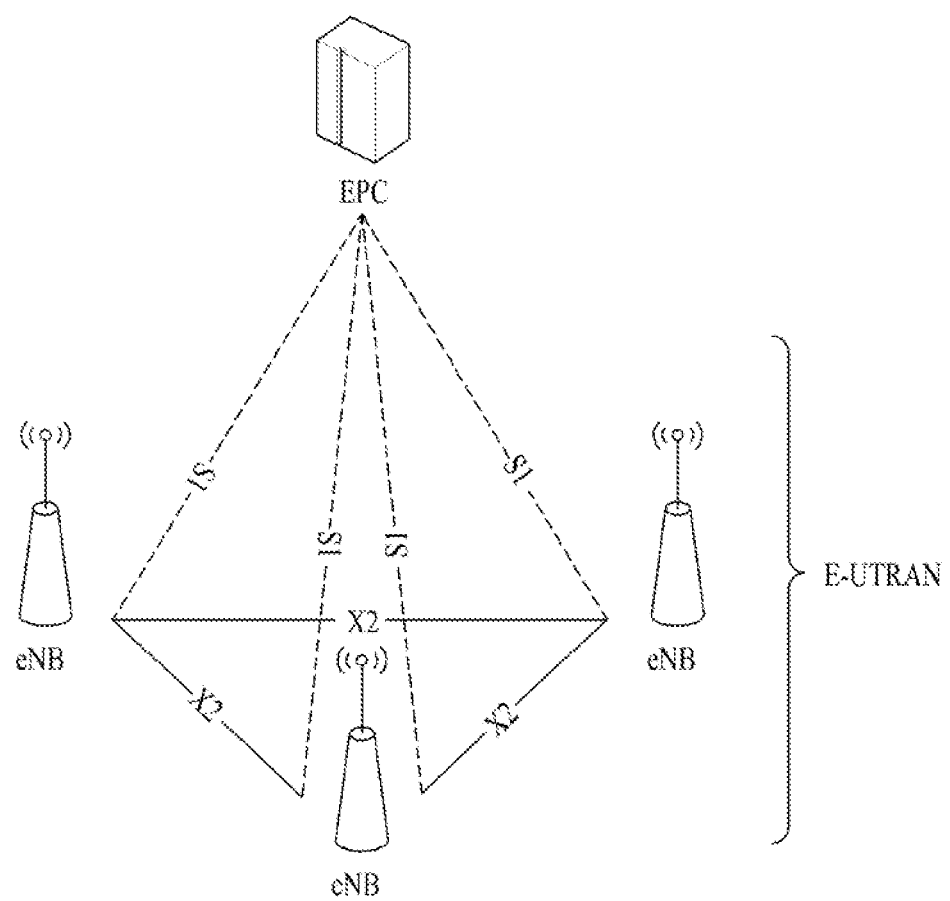
FIG. 2 is a conceptual diagram of E-UTRAN (evolved universal terrestrial radio access network) network structure.

FIG. 2 is a conceptual diagram of E-UTRAN (evolved universal terrestrial radio access network) network structure. In particular, the E-UTRAN system is a system evolved from a conventional UTRAN system. The E-UTRAN consists of cells (eNBs) and the cells are connected to each other via X2 interface. A cell is connected to a user equipment via a radio interface and is connected to EPC (evolved packet core) through S1 interface.

The EPC includes MME (mobility management entity), S-GW (serving-gateway) and PDN-GW (packet data network-gateway). The MME has an access information of a user equipment or information on a capability of a user equipment. This information is mainly used for a mobility management of user equipment. The S-GW is a gateway having E-UTRAN as an end point. The PDN-GW is a gateway having PDN (packet data network) as an end point.

Figure 3:
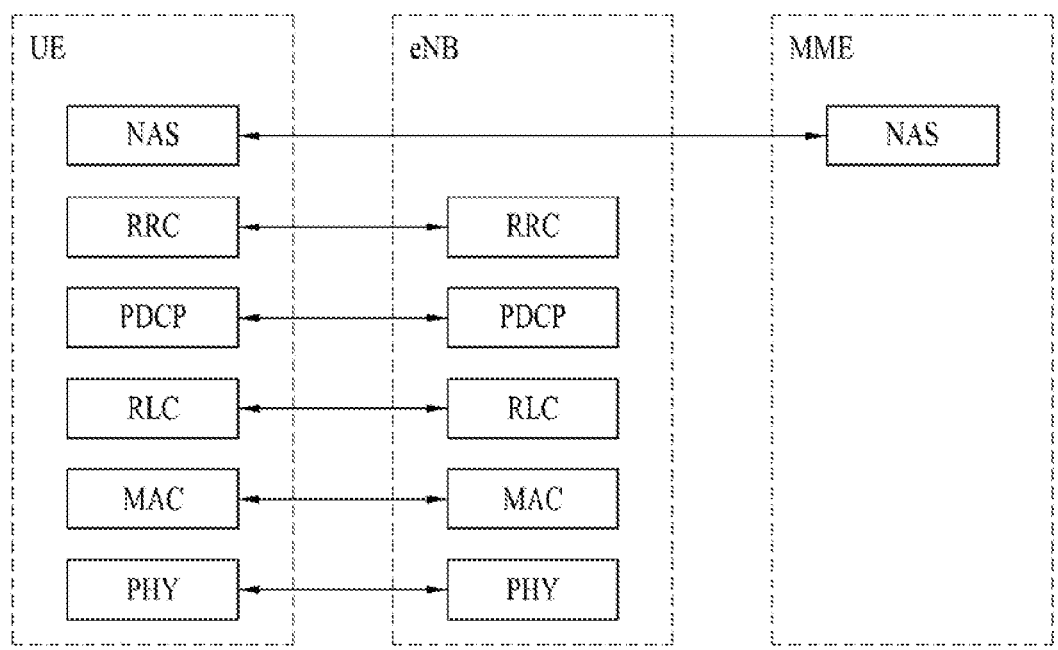
FIG. 3 is a diagram for structures of control and user planes of radio interface protocol between a 3GPP radio access network standard-based user equipment and E-UTRAN.
Figure 3:
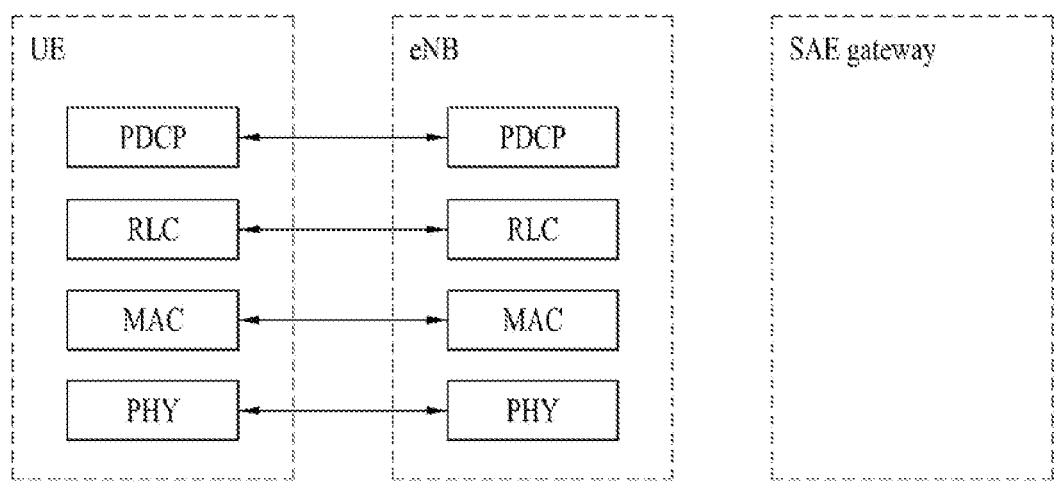

FIG. 3 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel).

Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 4:
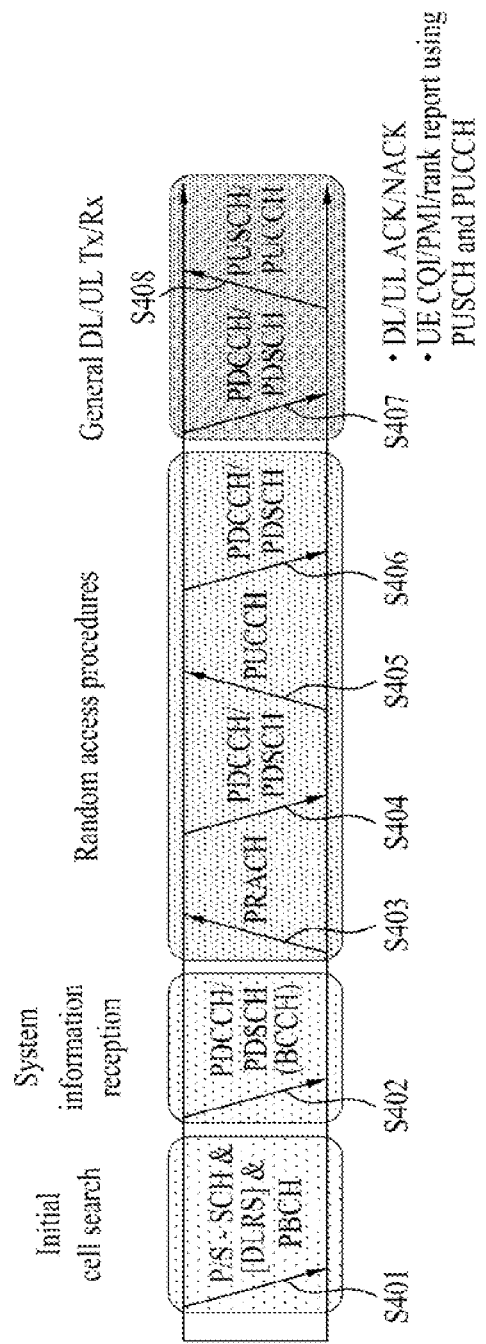
FIG. 4 is a diagram for explaining physical channels used for 3GPP system and a general signal transmission method using the physical channels.

FIG. 4 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S401]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S402].

Meanwhile, if a user equipment initially accesses an eNode B or does not have a radio resource for transmitting a signal, the user equipment may be able to perform a random access procedure to complete the access to the base station [S403 to S406]. To this end, the user equipment may transmit a specific sequence as a preamble on a physical random access channel (PRACH) [S403] and may be then able to receive a response message on PDCCH and the corresponding PDSCH in response to the preamble [S404]. In case of a contention based random access procedure (RACH), it may be able to additionally perform a contention resolution procedure.

Having performed the above mentioned procedures, the user equipment may be able to perform a PDCCH/PDSCH reception [S407] and a PUSCH/PUCCH (physical uplink shared channel/physical uplink control channel) transmission [S408] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 5:
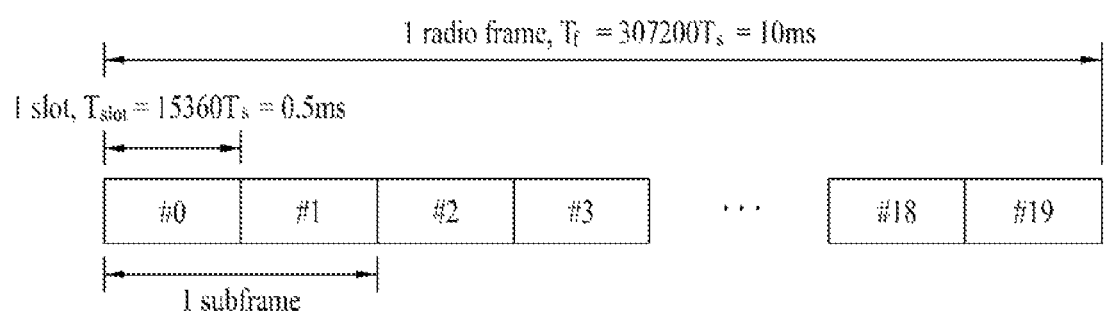
FIG. 5 is a diagram for a structure of a radio frame in LTE system.

FIG. 5 is a diagram for a structure of a radio frame used in an LTE system.

Referring to FIG. 5, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

In the following description, an RRC state of a user equipment and an RRC connecting method are explained. First of all, the RRC state may indicate whether the RRC of the user equipment is logically connected to the RRC of the E-UTRAN. If the RRCs are logically connected together, such a state can be named 'RRC_CONNECTED state'. Otherwise, such a state can be named 'RRC_IDLE state'.

Since E-UTRAN is able to recognize an existence of user equipment in the RRC_CONNECTED state by cell unit, the E-UTRAN is able to effectively control the corresponding user equipment. On the other hand, the E-UTRAN is unable to recognize the user equipment in the RRC_IDLE state by the cell unit. Hence, core network (CN) may manage the user equipment in the RRC_IDLE state by tracking area (TA) unit, which is a unit of area larger than a cell. Therefore, in order for the user equipment in RRC_IDLE state to receive such a service as a voice service, a data service from the cell, the corresponding user equipment should make a transition to an RRC_CONNECTED state.

When a user initially turns on a power of a user equipment, the user equipment searches for an appropriate cell and then stays in RRC_IDLE state in the found cell. If the user equipment staying in the RRC_IDLE state needs to establish an RRC connection, the user equipment establishes the RRC connection with an RRC of E-UTRAN and then makes a transition to RRC_CONNECTED state. In this case, a case of establishing an RRC connection may include a case that an uplink data transmission is required due to such a reason as a user's call attempt and the like, a case that a response message needs to be sent in response to a reception of a paging message from the E-UTRAN, and the like.

Figure 6:
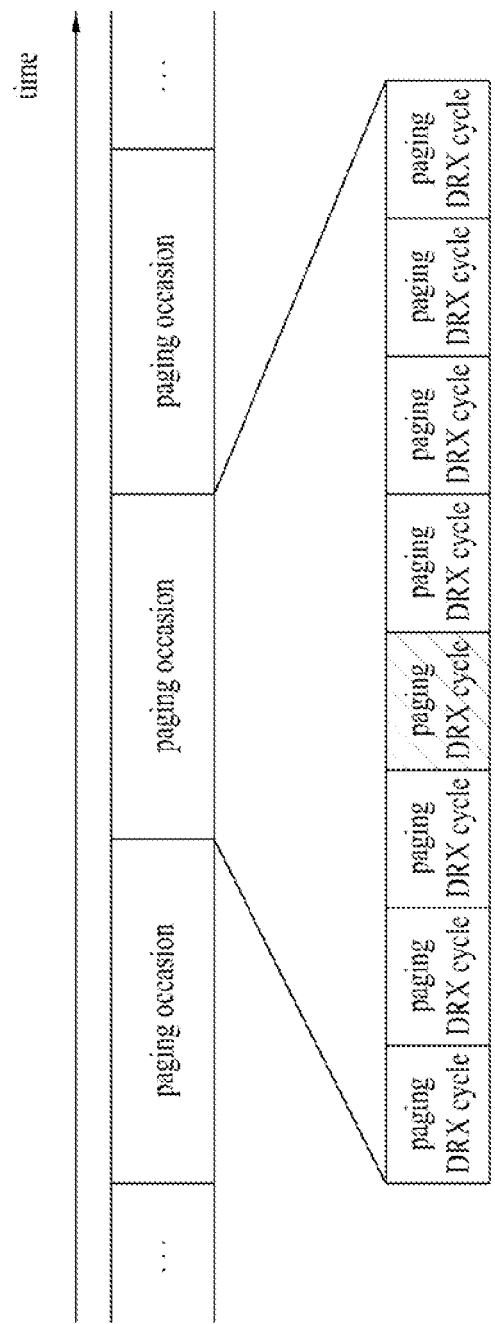
FIG. 6 is a diagram for explaining a general transceiving method using a paging message.

FIG. 6 is a diagram for explaining a general transceiving method using a paging message.

Referring to FIG. 6, a paging message includes a paging record consisting of a paging cause, a user equipment identity and the like. When the paging message is received, a user equipment may be able to perform a discontinuous reception (DRX) cycle for the purpose of power consumption reduction.

Specifically, a network may configure a plurality of paging occasions (PO) on every time cycle, which is called a paging cycle (paging DRX cycle). And, the network enables a specific user equipment to obtain a paging message by receiving a specific paging occasion only. The user equipment does not receive any paging channel except the corresponding specific paging occasion and may stay in an idle state to reduce power consumption. One paging occasion corresponds to one TTI (transmission time interval).

An eNode B and a user equipment use a paging indicator (hereinafter abbreviated PI) as a specific value for indicating a transmission of a paging message. The eNode B may define a specific identifier (e.g., paging-radio network temporary identity (P-RNTI)) with the purpose of PI usage and then may be able to inform the user equipment of a transmission of a paging information. For instance, the user equipment wakes up on every DRX cycle and then receives one subframe to know whether a paging message has appeared. If the P-RNTI exists on a L1/L2 control channel (PDCCH) of the received subframe, the user equipment may be able to know that a paging message exists on a PDSCH of the corresponding subframe. And, if the paging message includes a user equipment identifier (e.g., IMSI) of the user equipment, the user equipment may be able to receive a service in response to the eNode B (e.g., RRC connection or system information reception).

In the following description, system information is explained. First of all, the system information may include essential information a user equipment should know to access a network. Therefore, the user equipment should receive all system informations before accessing an eNode B and have latest system information all the time. Since system information is the information all user equipments in a cell should be aware of, the eNode B broadcasts the system information periodically.

System information may be divided into a master information block (MIB), a scheduling block (SB) and a system information block (SIB). The MIB enables a user equipment to know a physical configuration, e.g., bandwidth of a corresponding cell. Transmission information (e.g., transmission periods, etc.) of the SIBs are indicated by the SB. The SIB is a set of system informations related to each other. For instance, a specific SIB contains information on a neighbor cell only and a different SIB contains information on an uplink radio channel used by the user equipment only.

In the following description, a cell selection and reselection procedures are explained.

First of all, if a power of a user equipment is turned on, the user equipment should perform preparation procedures to receive a service in a manner that the user equipment selects a cell having an appropriate quality. The user equipment in an idle state should be ready to receive a service from a corresponding cell in a manner that the user equipment selects a cell having an appropriate quality all the time. For instance, the user equipment whose power has been just turned on should select a cell having an appropriate quality to register for a network. When the user equipment in RRC_CONNECTED state enters a state of RRC_IDLE, the user equipment should select a cell to stay therein in RRC_IDLE state. Thus, in order for the user equipment to stay in such a service-standby state as an RRC_IDLE state, a procedure for selecting a cell that meets a specific condition is called a cell selection. Since the cell selection is currently performed under a condition that the user equipment has not determine a cell to stay therein in the RRC_IDLE state yet, a most significant point is to select a cell as quickly as possible. Therefore, if a cell provides a radio signal quality equal to or greater than a prescribed reference, although the cell fails in providing a best radio signal quality to the user equipment, the cell can be selected in the cell selection procedure performed by the user equipment.

If the user equipment selects a cell that meets a cell selection reference, the user equipment receives information necessary for operations in RRC_IDLE state of the user equipment in the corresponding cell from system information of the corresponding cell. Having received all informations necessary for the operations in RRC_IDLE state, the user equipment makes a request for a service to a network or stands by in RRC_IDLE state to receive a service from the network.

After the user equipment has selected a specific cell through the cell selection procedure, a strength or quality of a signal between the user equipment and an eNode B may change due to a mobility of the user equipment, a change of a radio environment or the like. Hence, in case that the quality of the selected cell is degraded, the user equipment may be able to select a different cell providing a better quality. Thus, in case of selecting a cell again, the user equipment selects a cell providing a signal quality better than that of a currently selected cell in general. This procedure is called a cell reselection. In aspect of a quality of a radio signal, the basic object of the cell reselection procedure is to select a cell providing a best quality to the user equipment in general. Aside from the aspect of the quality of the radio signal, a network determines a priority per frequency and may then inform the user equipment of the determined priority. Having received this priority, the user equipment may preferentially consider the received priority in a cell reselection procedure other than a radio signal quality reference.

In the following description, a random access (RA) procedure provided by an LTE system is explained. First of all, the random access procedure provided by the LTE system is classified into a contention based random access procedure or a non-contention based random access procedure. The classification into the contention based random access procedure or the non-contention based random access procedure is determined depending on whether a random access preamble used for the random access procedure is directly selected by a user equipment or an eNode B.

In the non-contention based random access procedure, the user equipment may use a random access preamble directly assigned to the user equipment by the eNode B. Hence, if the eNode B assigned the specific random access preamble to the user equipment only, the random access preamble received from the eNode B may be used by the user equipment only and other user equipments do not use the random access preamble. Therefore, since 1-to-1 relationship between the random access preamble and the user equipment using the random access preamble is established, contention may be regarded as non-existing. In doing so, since the eNode B is able to know which user equipment has transmitted the random access preamble as soon as receives the random access preamble, this case may be regarded as efficient.

On the other hand, in the contention based random access procedure, since the eNode B transmits a random access preamble in a manner of randomly selecting the corresponding preamble from the random access preambles available for the user equipment, there exists a possibility that a plurality of user equipments may use the same random access preamble all the time. Therefore, although the eNode B receives a specific random access preamble, the eNode B is unable to know which user equipment has transmitted the random access preamble.

A case for a user equipment to perform a random access procedure include one of: 1) a case of performing an initial access due to having no connection (RRC connection) with an eNode B; 2) a case of an initial access to a target cell in the course of a handover; 3) a case of being requested by a command of the eNode B; 4) a case of UL data occurrence in a situation that a UL time synchronization is not matched or a designated radio resource used for making a request for a radio resource is not allocated; and 5) a case of a recovery procedure for a radio link failure or a handover failure.

Figure 7:
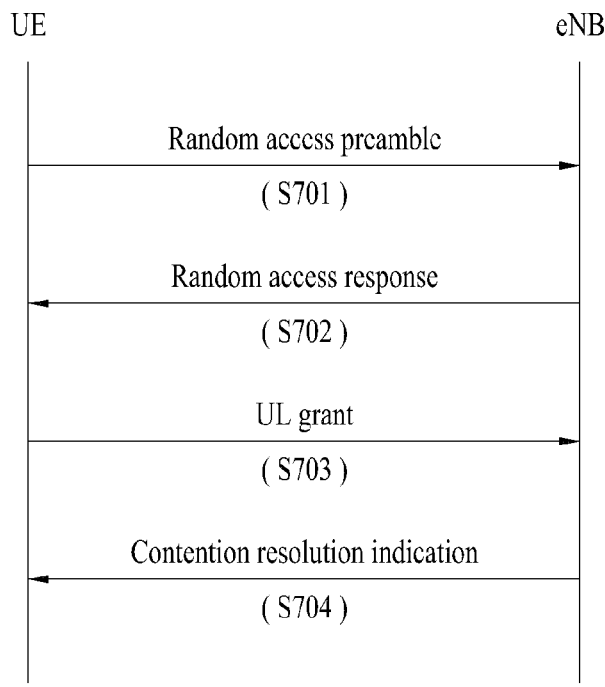
FIG. 7 is a diagram of an operating process between a user equipment (UE) and an eNode B (eNB) in a contention based random access procedure provided by LTE system.

FIG. 7 is a diagram of an operating process between a user equipment (UE) and an eNode B (eNB) in a contention based random access procedure provided by LTE system.

Referring to FIG. 7, in the step S701, a user equipment randomly selects a random access preamble from a set of random access preambles indicated by system information or a handover command, selects a PRACH resource for carrying the random access preamble, and then transmits the selected random access preamble thereon. In this case, the preamble is called a RACH MSG 1.

In a step S702, after the user equipment has transmitted the random access preamble, the user equipment attempts a reception of its random access response in a random access response receiving window indicated by an eNode B through the system information or the handover command. In particular, RACH MSG 2 (i.e., the random access response information) may be transmitted in form of MAC PDU and the MAC PDU may be delivered on PDSCH. In particular, in order for the user equipment to receive the information delivered on the PDSCH properly, PDCCH is also delivered together. In particular, information on the user equipment necessary to receive the PDSCH, a frequency and time information of a radio resource of the PDSCH, a transmission format of the PDSCH and the like may be included in the PDCCH. Once the user equipment succeeds in the reception of the PDCCH transmitted to the user equipment, it may be able to appropriately receive a random access response carried on the PDSCH in accordance with the informations of the PDCCH. And, the random access response may include a random access preamble identifier, a UL grant, a temporary C-RNTI, a time synchronization correction value (time alignment command), and the like. The reason for requiring the random access preamble identifier in the foregoing description is, since one random access response may be able to contain random access response information for at least one or more user equipments, to indicate that each of the UL grant, the temporary C-RNTI and the time synchronization correction value are valid for which user equipment. The random access preamble identifier matches the random access preamble selected by the user equipment in the step S701.

Subsequently, in a step S703, if the user equipment receives the random access response valid for the user equipment itself, the user equipment may separately process the informations included in the random access response. In particular, the user equipment applies the time synchronization correction value and saves the temporary C-RNTI. Moreover, the user equipment transmits a data stored in a buffer of the user equipment or a newly created data to the eNode B using the UL grant. In this case, the data transmitted via the UL grant, i.e., MAC PDU is named a RACH MSG 3. It is mandatory for the data included in the UL grant to contain an identifier of the user equipment. In particular, since in the contention based random access procedure, the eNode B is unable to determine which user equipments perform the random access procedure, the eNode B should identify a user equipment to resolve a future contention. In order to have a user equipment identifier contained, two kinds of methods are available as follows. First of all, according to a $1^{st}$ method, if a user equipment has a valid cell identifier already assigned by a corresponding cell prior to the random access procedure, the user equipment transmits its cell identifier via the UL grant. On the contrary, if the user equipment fails to receive the assignment of a valid cell identifier prior to the random access procedure, the user equipment transmits its unique identifier. In general, the unique identifier is longer than the cell identifier. If the user equipment transmits data via the UL grant, the user equipment initiates a contention resolution timer.

Finally, in step S704, after the user equipment has transmitted the data containing the identifier of its own via the UL grant included in the random access response, the user equipment waits for an instruction from the eNode B for the contention resolution. In particular, the user equipment may attempt a reception of PDCCH to receive a specific message. In receiving the PDCCH, there are two kinds of methods as well. As mentioned in the foregoing description, if the identifier of its own transmitted via the UL grant is a cell identifier, the user equipment attempts a reception of the PDCCH using the cell identifier of its own. If the identifier is a unique identifier, the user equipment attempts a reception of the PDCCH using a temporary C-RNTI included in the random access response. Thereafter, in the former case, if the user equipment receives the PDCCH (i.e., RACH MSG 4) via the cell identifier of its own before expiration of the contention resolution timer, the user equipment determines that the random access procedure has been normally performed and then ends the random access procedure. In the latter case, if the PDCCH is received via a temporary C-RNTI before expiration of the contention resolution timer, the user equipment checks data delivered on PDSCH indicated by the PDCCH. If the unique identifier of the user equipment is included in a content of the data, the user equipment determines that the random access procedure has been normally performed and then ends the random access procedure.

In the following description, a general handover (HO) procedure mentioned in the description of 3GPP LTE system is explained.

Figure 8:
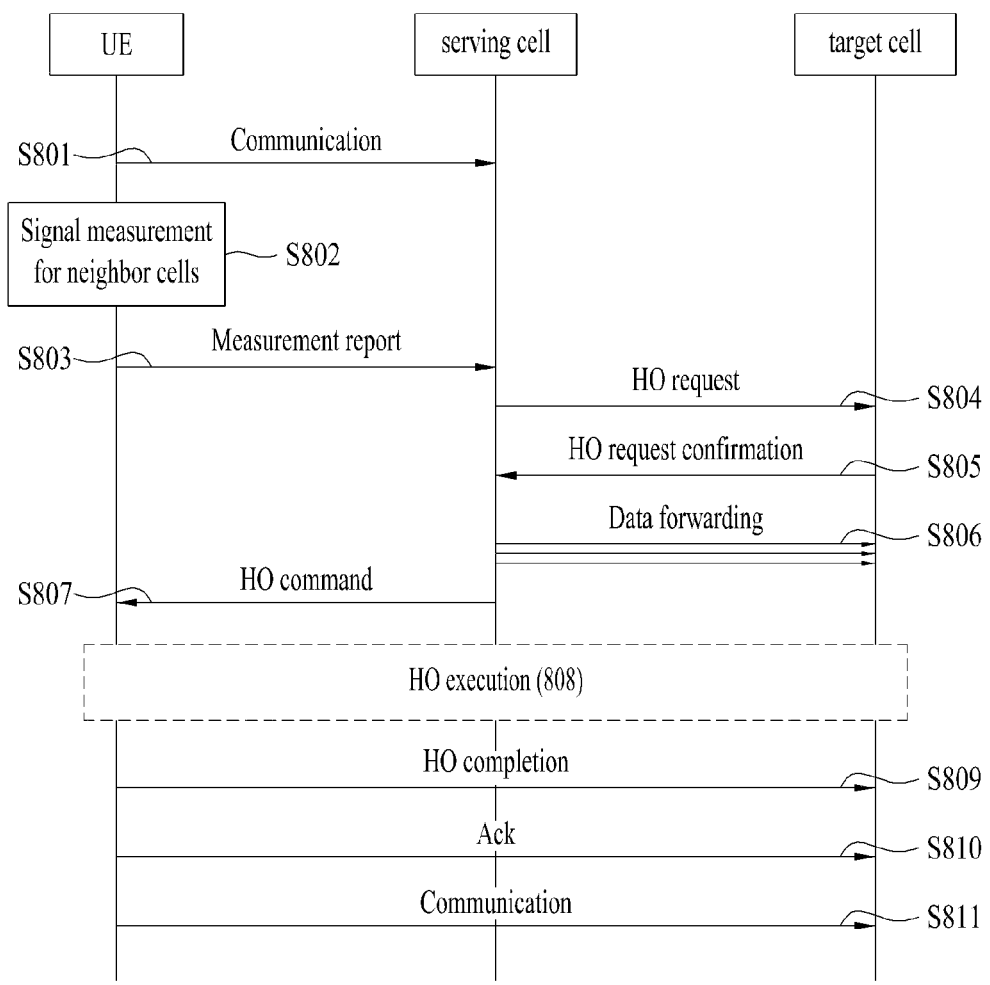
FIG. 8 is a signal flowchart of a handover procedure in 3GPP LTE system.

FIG. 8 is a signal flowchart of a handover procedure in 3GPP LTE system.

Referring to FIG. 8, first of all, assume that a user equipment (UE) is communicating with a serving cell in a step S801. In doing so, the user equipment periodically measures signals of neighbor cells in a step S802 and then delivers the strengths of the measured signals to the currently accessed serving cell in a step S803.

In a step S804, if a cell having a signal strength available for a handover of the user equipment exists among neighbor cells, the serving cell sends a handover request message to the cell (i.e., a target cell) available for the handover. The handover request message may include handover related cell ID (i.e., a serving cell ID and a target cell ID), context information of the user equipment, a reason for making the handover, and UE's moving path information (e.g. UE history information). The context information of the user equipment may include a security, a service QoS, a user priority level and the like. And, the UE's moving path information may include a cell ID list of cells into which the user equipment has moved.

In a step S805, having received the handover request message, the target cell delivers a handover request confirmation message to the serving cell and then informs the serving cell whether the UE's handover into the target cell is granted. In a step S806, if the target cell grants the handover, the serving cell may forward data traffic of the user equipment to the target cell.

In a step S807, the serving cell commands the user equipment to make a handover into the target cell in a manner of sending a handover command message to the user equipment. Having received the handover command message, the user equipment accesses the target cell in a manner of performing a handover execution process [S808] and then sends a handover completion message to the target cell [S809]. In a step S810, the target cell transmits a response signal, e.g., an ACK signal to the user equipment. Finally, in a step S811, the user equipment and the target cell continue to communicate with each other.

In the following description, a femtocell is explained. First of all, a femtocell is a very small mobile communication base station installed indoors (e.g., at home, at office, etc.). The femtocell is connected to a femtocell network controller (FNC) by wire through a broadband network. The femtocell controller is connected to a cellular core network. Currently, the femtocell related standardization by such an international organization as 3GPP LTE, IEEE 802.16m and the like is in progress.

The femtocell has various advantages in enlarging indoor coverage, enhancing a call quality and providing various fixed-mobile convergence services efficiently. And, femtocell types may be classified into a CSG (closed subscriber group) femtocell and an open access femtocell in accordance with an access grant policy for the femtocell. In particular, in case of the CSG femtocell, an access to a femtocell is granted only to a user equipment granted for the corresponding femtocell. And, the open access femtocell means the femtocell that provides services to serviceable user equipments without restriction.

In a current 3GPP standard, in order to enable a user equipment to check a femtocell type, a CSG ID is assigned to a femto cell and a CSG ID list, i.e., a femtocell white list accessible by the corresponding user equipment is stored in a USIM (universal subscriber identity module) of the femtocell supportive user equipment. The corresponding femtocell periodically transmits the CSG ID using a control channel to check the femtocell type of the mobile user equipment.

In the following description, a fixed mobile convergence (hereinafter abbreviated FMC) is explained. First of all, the FMC is a scheme of enabling a dual-mode user equipment to use the same service of GSM/GPRS through an unlicensed radio frequency when the dual-mode user equipment approaches an unlicensed mobile access (hereinafter abbreviated UMA) radio base station that uses Bluetooth or Wi-Fi. Currently, service providers of various countries are providing users with services by the FMC scheme.

In case of a dual-mode user equipment of a related art, if the user equipment enters a coverage of a accessible small radio base station, which uses Wi-Fi or Bluetooth, while communicating with a cellular mobile communication base station (e.g., a macro base station) having a wide communication range, the user equipment may make a handover into the small radio base station and continue to communicate on high bandwidth seamlessly. The UMA (unlicensed mobile access), which is enabling this dual-mode communication, is defined in the 3GPP standard. In particular, like a seamless handover between conventional cellular base stations, the UMA user equipment device enables a seamless handover between a cellular base station and the UMA radio base station to be performed.

In particular, many ongoing efforts are made to research and develop a technology for performing a communication via such a WPAN (wireless personal area networks) technology as Wi-Fi, Bluetooth and the like using a unlicensed band, if necessary, in the course of performing a seamless communication using a licensed band in such a personal space as a home, an office and the like in a manner of combining this FMC scheme and a femtocell cellular mobile communication method in one femtocell.

A mobile femtocell mentioned in the description of the present invention is explained as follows.

Figure 9:
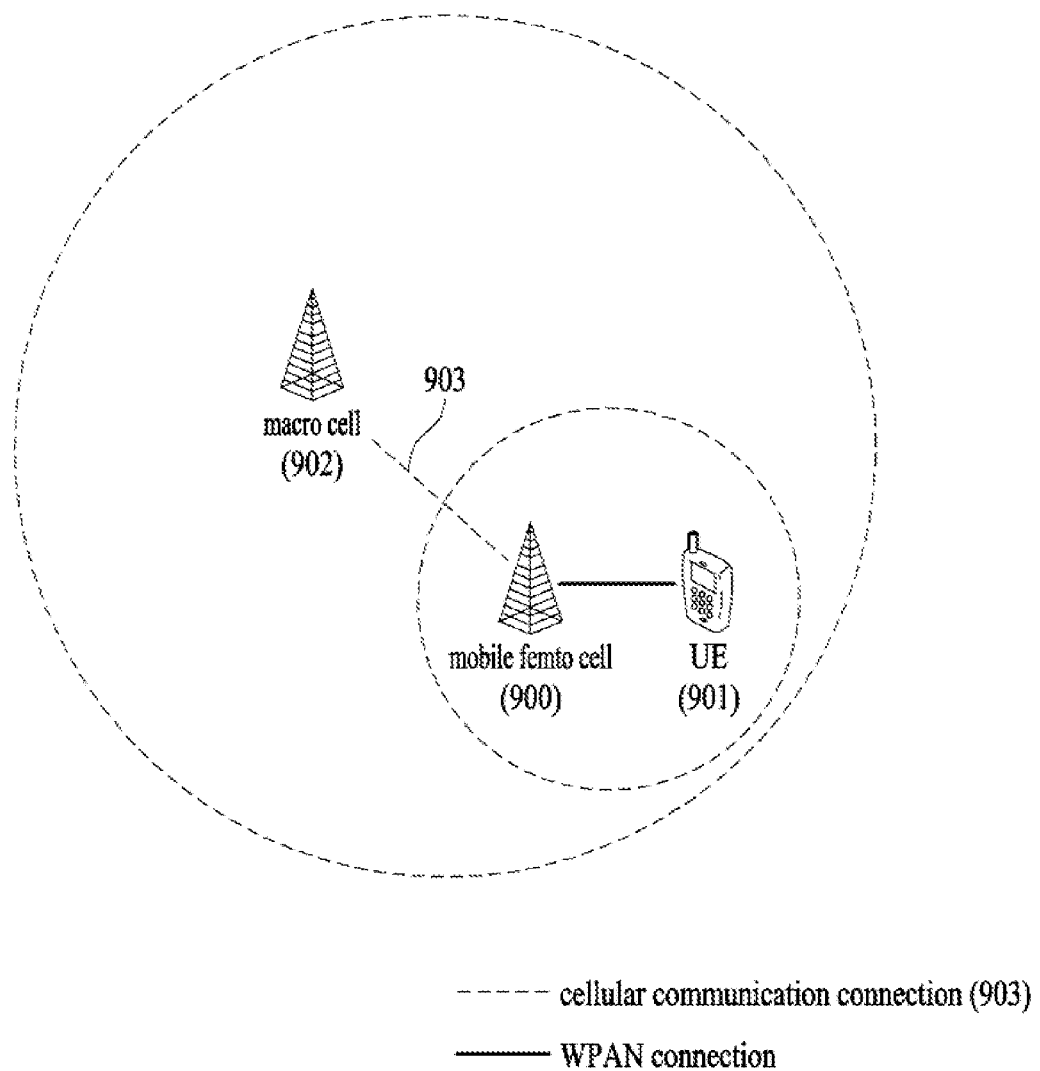
FIG. 9 is a diagram for explaining a general mobile femtocell connecting method.

FIG. 9 is a diagram for explaining a general mobile femtocell connecting method.

First of all, a mobile femtocell may mean that a legacy femtocell has mobility. Unlike a general femtocell, the mobile femtocell 900 is connected to a macro cell 902 not by a wired broadband access method but by a cellular communication method 903, i.e., a radio access method to be connected to a core network (CN) and then may communicate with the CN via the macro cell 902.

Generally, in order to minimize power consumption, if it is not necessary for the mobile femtocell 900 to further communicate with a user equipment 901, a connected state of the mobile femtocell is shifted to an idle state. An operation of the mobile femtocell in idle state is identical to the general idle state of IEEE 802.16 system or the general idle state of 3GPP LTE system.

In case that a mobile communication user equipment communicates with an adjacent macro cell or an access point (AP) in a manner of accessing the adjacent macro cell or the access point (AP) while communicating with a mobile femtocell, which is a serving cell, the present invention proposes a method capable of resuming a communication by performing a fast re-access to the previously accessed mobile femtocell.

The fast re-access of a user equipment proposed by the present invention is defined as a fast rollback. And, a neighbor cell accessible by the user equipment may become a macro cell, a femtocell, or an AP of WLAN or the like, which may non-limit specific communication technologies. If the user equipment operates using a specific radio access method, the corresponding radio access method shall be named clearly.

The main usage of the method proposed by the present invention is a case that a user equipment makes a handover into a neighbor cell to prevent power consumption of a mobile femtocell. In particular, when the mobile femtocell and the mobile femtocell accessed user equipment move into a coverage of a specific neighbor cell, the user equipment may make a handover into the neighbor cell and the mobile femtocell may operate in an idle state (i.e., a sleep mode), whereby the power consumption can be minimized.

In doing so, the mobile femtocell designates itself as an anchor cell and then asks the user equipment or a target cell to transmit related information necessary for performing a fast rollback before/after a handover of the user equipment. After the user equipment has handed over into a neighbor cell, the corresponding user equipment or the target cell accessed by the user equipment may periodically transmit the fast rollback related information to the mobile femtocell, which is an anchor cell, or may transmit the fast rollback related information to the mobile femtocell in case that the corresponding information changed.

Thereafter, when the user equipment and the mobile femtocell leave the coverage of the target cell, the mobile femtocell may preemptively ask the user equipment to make a handover into the mobile femtocell using the previously received fast rollback related information or may be able to minimize or omit the procedures necessary for a conventional handover using the previously received fast rollback related information. This is because the fast rollback related information contains informations necessary for the user equipment to make a handover.

Another example includes a case that a user equipment, which has accessed a specific mobile femtocell, is no longer able to communicate with the specific mobile femtocell due to a disorder or a malfunction of a backhaul link of the mobile femtocell. In this case, the mobile femtocell is not able to deliver a user data received from the user equipment to a core network (CN) due to the disorder of the backhaul link. Yet, a radio communication with the user equipment is possible.

In this case, the mobile femtocell sets itself as an anchor cell and informs the user equipment of the corresponding setting. And, the mobile femtocell enables the user equipment to make a handover into a target cell. The user equipment delivers the fast rollback related information to the mobile femtocell, which is the anchor cell, while performing a communication with the target cell by accessing the target cell. Thereafter, if the mobile femtocell normally operates, the user equipment may be able to perform a fast rollback procedure in response to a request made by the mobile femtocell.

In the following description, the present invention is described in detail. First of all, prior to making a handover into the target cell or performing an initial access procedure, the user equipment designates the previously accessed mobile femtocell as an anchor cell. Therefore, although the user equipment does not have an access to the mobile femtocell anymore, the user equipment maintains information necessary for performing a re-access to the mobile femtocell without initializing the information. When the user equipment attempts to move into a different cell while communicating with the target cell, the user equipment sets the mobile femtocell as a cell having a top priority to access. In doing so, the mobile femtocell does not need to maintain an active state for maintaining a continuous communication with the user equipment and makes a transition to an idle state to minimize power consumption.

Yet, while communicating with a neighbor base station after the user equipment has moved into the neighbor base station, the user equipment should deliver information necessary for performing the fast re-access, i.e., a fast rollback to the mobile femtocell, which is the anchor cell. To this end, the present patent defines two kinds of methods as follows.

First of all, a first method is to transmit the fast rollback related information to the mobile femtocell using such a low power access scheme capable of minimizing power consumption as a WPAN (wireless personal area networks) and the like. In particular, the user equipment may be able to communicate with the mobile femtocell in a manner of newly establishing a WPAN radio connection. This method has an advantage in that the user equipment is able to immediately make a re-access request to the mobile femtocell when the user equipment needs the re-access to the mobile femtocell. Yet, since the user equipment has to maintain the access to both the target cell and the mobile femtocell at the same time, this method also has a disadvantage in that power consumption may become serious. Yet, since the WPAN access technology is a technology requiring a relatively low power consumption compared to that of a conventional communication method or a WLAN technology, it would not put a considerable burden on the energy consumption of the user equipment unless a remaining battery love of the user equipment is considerably low.

Secondly, a second method is a method for the mobile terminal to deliver the fast rollback related information to the mobile femtocell via a newly accessed target cell and an IP network connected to the target cell. This method has an advantage in that only one radio access to the target cell, which is established by the user equipment, needs to be maintained. Yet, a time taken to deliver information may increase. Moreover, since the mobile femtocell is in an idle state, a time delay may occur until the mobile femtocell receives the fast rollback related information.

Thereafter, while communicating with the target cell by accessing thereto, the user equipment may periodically transmit the fast rollback related information to the mobile femtocell or may transmit it only if the corresponding information is changed. In doing so, when the user equipment needs to move into the previously accessed mobile femtocell again, the mobile femtocell is able to quickly process the re-access of the user equipment using the fast rollback related information.

The fast rollback related information may include a security information on a user equipment, a user equipment registration information (subscription info), a performance information on a user equipment (UE capability), an information on frequency channel and resources used for a communication by a user equipment, an operational state and QoS information on a service managed by a user equipment, a network address information on a network address information currently used on a network by a user equipment and the like. Yet, since the performance information (UE capability) and the user equipment registration information (subscription information) are static informations, it is highly probable that the mobile femtocell, which is an anchor cell, may maintain the informations after releasing the access from the user equipment. Hence, it is preferable that the performance information on the user equipment (user equipment capability) and the user equipment registration information (subscription information) are included in the fast rollback related information only if the mobile femtocell, which is the anchor cell, does not have the corresponding informations.

The re-access request made by the user equipment to the mobile femtocell, which is the anchor cell of the user equipment, may be accomplished by either the user equipment or the mobile femtocell. Additionally, if the user equipment is able to inform the currently accessed target cell what is its anchor cell in advance, the target cell may be able to deliver the re-access request made by the user equipment to the mobile femtocell (i.e., the anchor cell).

Having received the re-access request, the mobile femtocell may make a transition from an idle state to an active state and may then attempt to access the user equipment. In doing so, the user equipment and the mobile femtocell may be able to perform a fast access using the previously exchanged fast rollback related information.

Figure 10:
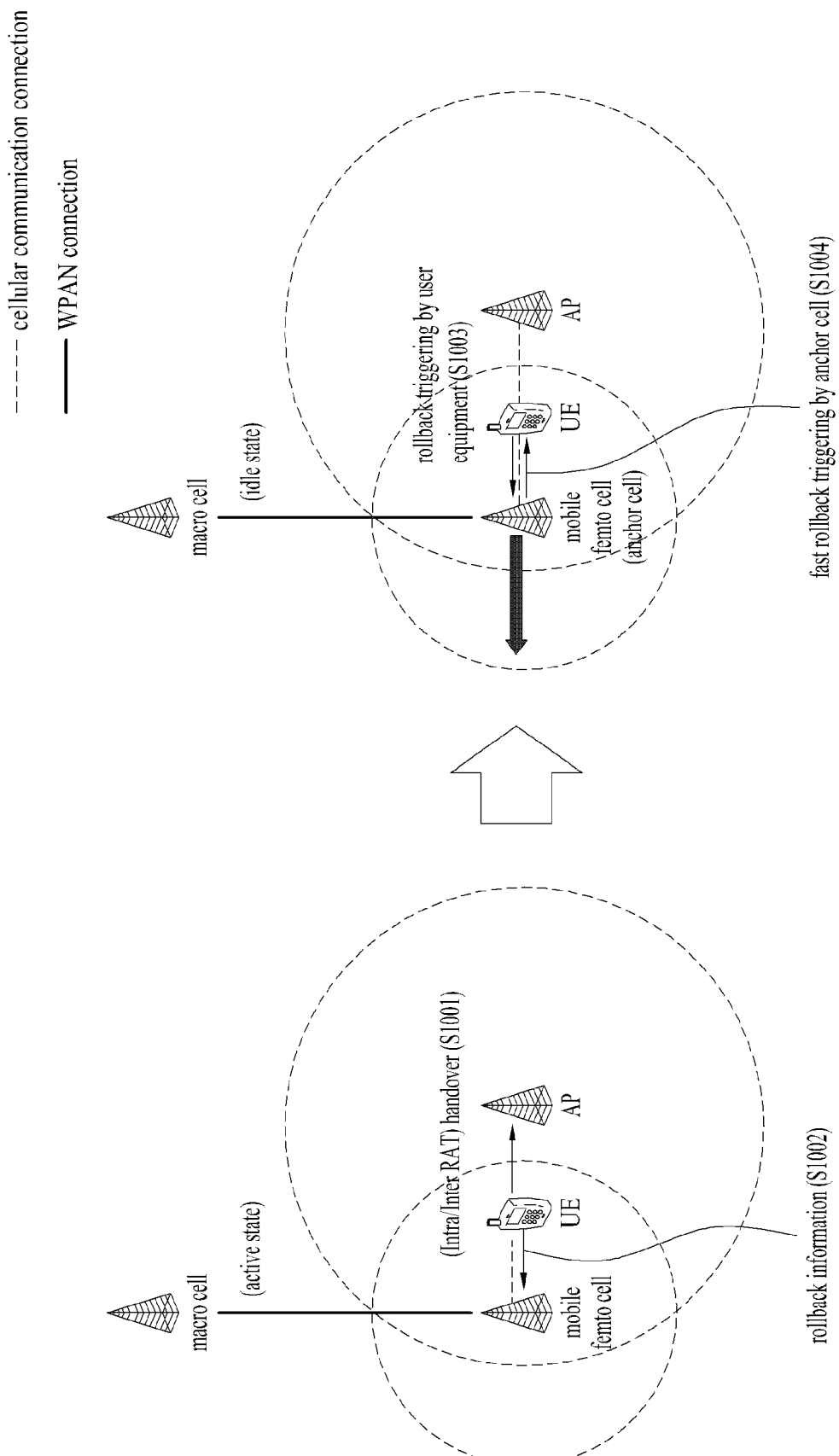
FIG. 10 is a diagram for one example of a process for a user equipment to perform a fast rollback to a mobile femtocell according to embodiments of the present invention.

FIG. 10 is a diagram for one example of a process for a user equipment to perform a fast rollback to a mobile femtocell according to embodiments of the present invention.

Referring to FIG. 10, a user equipment may be able to perform a handover into an AP or may be able to perform a cell reselection, in a step S1001. In this case, the user equipment may set a mobile femtocell as an anchor cell for a fast rollback and then temporarily ends an access to the mobile femtocell. Meanwhile, a connected state between the mobile femtocell and a macro cell makes a transition from an active state to an idle state.

And, in a step S1002, while communicating with an AP, which is a new target cell, by accessing thereto, the user equipment may directly transmit the fast rollback related information to the mobile femtocell, which is the anchor cell, or may transmit it via the currently accessed AP.

Thereafter, as the mobile femtocell has moved, if the user equipment is unable to access the target cell, the user equipment sends a fast rollback command message to the mobile femtocell, which is the anchor cell, in a step S1003. Alternatively, the mobile femtocell, which is the anchor cell, sends the fast rollback command message to the user equipment, in a step S1004. Therefore, a fast handover procedure or a re-access procedure can be performed using the previously received fast rollback related information.

Figure 11:
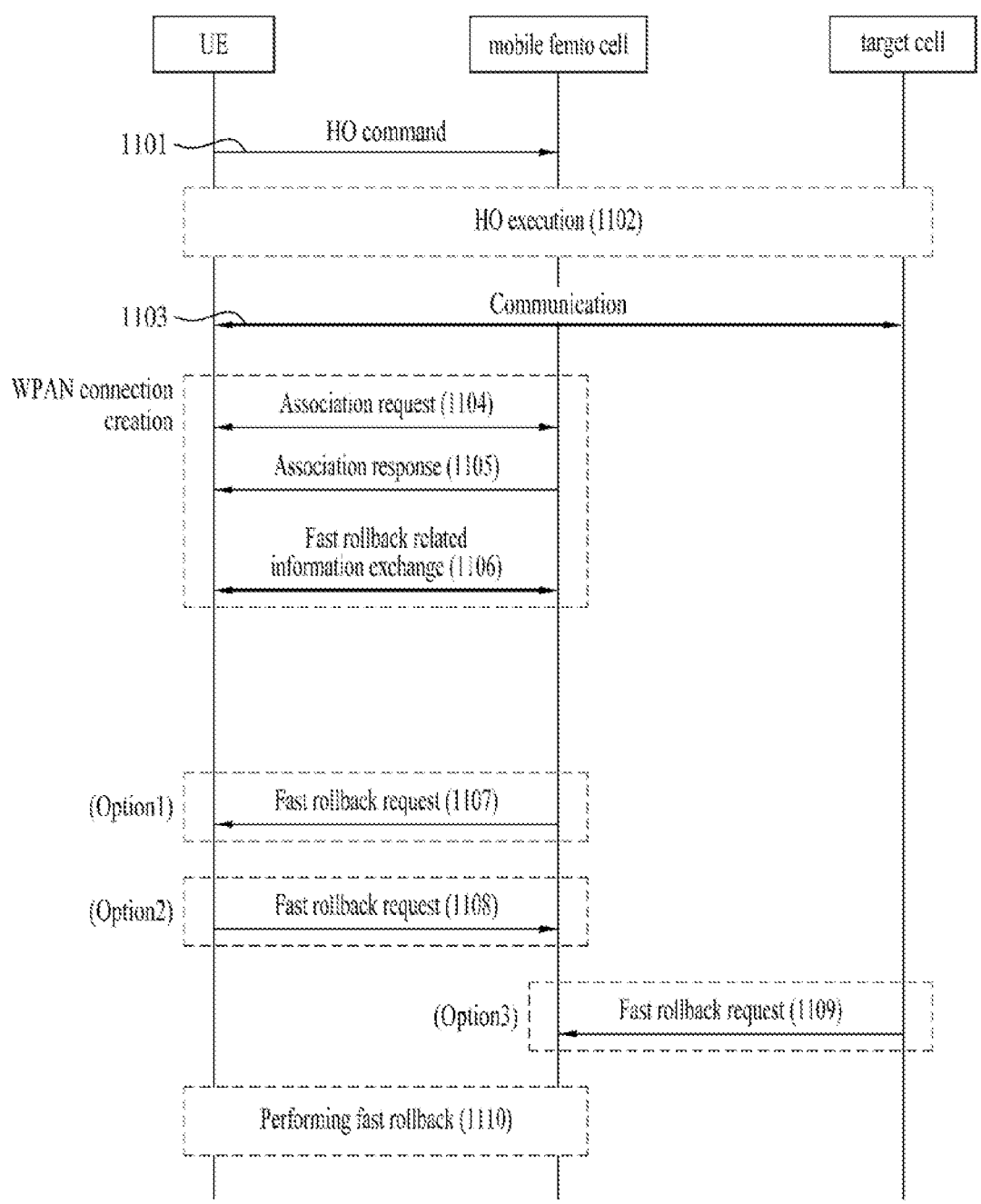
FIG. 11 is a signal flowchart for a fast rollback process according to embodiments of the present invention.

FIG. 11 is a signal flowchart for a fast rollback process according to embodiments of the present invention.

Referring to FIG. 11, a mobile femtocell sends a handover command message to a user equipment, in step S1101. And, the user equipment performs a handover procedure on a target cell, in step S1102. In this case, the user equipment sets the mobile femtocell as an anchor cell. After the handover process has been completed, the user equipment and the target cell may be able to continue to communicate with each other, in step S1103.

As mentioned in the foregoing description, assume that WPAN access has been established between the mobile femtocell, which is the anchor cell, and the user equipment. In particular, the user equipment sends an association request message for the WPAN access to the anchor cell, in a step S1104. Having received the association request message, the anchor cell responds to the user equipment in a manner of sending an association response message, in a step S1105. In a step S1106, the user equipment and the anchor cell may be able to exchange the aforementioned fast rollback related information with each other via the WPAN access.

Thereafter, as the mobile femtocell has moved, if the user equipment is unable to access the target cell, a triggering of a fast rollback request message may occur. In this case, the mobile femtocell, which is the anchor cell, may perform the triggering by sending the fast rollback request message to the user equipment, in a step S1107. Alternatively, the user equipment may perform the triggering by sending the fast rollback request message to the mobile femtocell, which is the anchor cell, in a step S1108. In particular, in a step S1109, it may be able to consider the target cell as performing the triggering by sending the fast rollback request message to the mobile femtocell.

Finally, in step S1110, in a manner that the triggered fast rollback is performed by the user equipment and the mobile femtocell, thereby completing the handover or the re-access.

Figure 12:
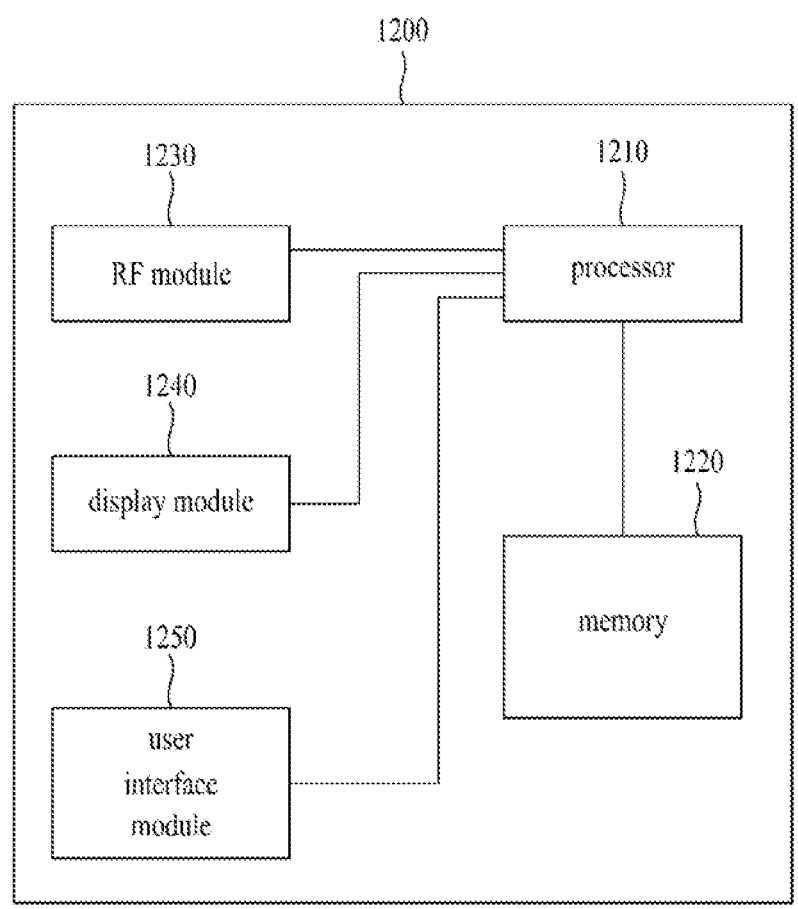
FIG. 12 is a block diagram for a configuration of a wireless communication device according to one embodiment of the present invention.

FIG. 12 is a block diagram for a configuration of a wireless communication device according to one embodiment of the present invention.

Referring to FIG. 12, a communication device 1200 may include a processor 1210, a memory 1220, an RF module 1230, a display module 1240, and a user interface module 1250.

Since the communication device 1200 is depicted for clarity of description, prescribed module(s) may be omitted in part. The communication device 1200 may further include necessary module(s). And, a prescribed module of the communication device 1200 may be divided into subdivided modules. A processor 1210 is configured to perform an operation according to the embodiments of the present invention illustrated with reference to drawings. In particular, the detailed operation of the processor 1210 may refer to the former contents described with reference to FIG. 1 to FIG. 11.

The memory 1220 is connected with the processor 1210 and stores an operating system, applications, program codes, data, and the like. The RF module 1230 is connected with the processor 1210 and then performs a function of converting a baseband signal to a radio signal or a function of converting a radio signal to a baseband signal. To this end, the RF module 1230 performs an analog conversion, amplification, a filtering, and a frequency up conversion, or performs processes inverse to the former processes. The display module 1240 is connected with the processor 1210 and displays various kinds of informations. And, the display unit 1240 can be implemented using such a well-known component as an LCD (liquid crystal display), an LED (light emitting diode), an OLED (organic light emitting diode) display and the like, by which the present invention may be non-limited. The user interface module 1250 is connected with the processor 1210 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a base station and a terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a method for transmitting/receiving a signal to/from a mobile femtocell in a wireless communication system and apparatus therefor are described with reference to examples applied to 3GPP LTE system, it may be applicable to various kinds of wireless communication systems as well as to the 3GPP LTE system.

What is claimed is:

1. A method of processing a signal, which is processed by a user equipment (UE) in a wireless communication system having a mobile femtocell currently communicating with the UE via a first communication link, the method comprising:
   if the UE and the mobile femtocell enter a coverage of an adjacent cell, establishing, by the UE, a second communication link with the adjacent cell and disconnecting the first communication link;
   setting the mobile femtocell as an anchor cell in an idle state when the second communication link is established;
   transmitting an association request message to the mobile femtocell for a wireless personal access network (WPAN) communication link;
   receiving an association response message from the mobile femtocell;
   transmitting first communication link related information via the WPAN communication link to the mobile femtocell while communicating with the adjacent cell via the second communication link; and
   after the mobile femtocell and the UE left the coverage of the adjacent cell, re-establishing, by the UE, the first communication link with the mobile femtocell by operating a fast rollback procedure based on the first communication link related information,
   wherein the first communication link related information is configured to exclude subscription information of the UE and capability information of the UE when the mobile femtocell maintains the subscription information of the UE and the capability information of the UE after the first communication link is disconnected.

2. The method of claim 1, wherein re-establishing the first communication link comprises receiving, by the UE, a first communication link re-establishment request message from the mobile femtocell.

3. The method of claim 1, wherein re-establishing the first communication link comprises sending, by the UE, a first communication link re-establishment request message to the mobile femtocell.

4. A user equipment (UE) device in a wireless communication system having a mobile femtocell currently communicating with the UE device via a first communication link, the UE device comprising:
   an RF (radio frequency) module configured to transmit/receive signals; and
   a processor configured to:
   control the RF module and process the signals;
   establish a second communication link with an adjacent cell and disconnect the first communication link, if the UE device and the mobile femtocell enter a coverage of the adjacent cell;
   set the mobile femtocell as an anchor cell in an idle state when the second communication link is established;
   transmit an association request message to the mobile femtocell for a wireless personal access network (WPAN) communication link;
   receive an association response message from the mobile femtocell;
   transmit first communication link related information via the WPAN communication link to the mobile femtocell while communicating with the adjacent cell via the second communication link; and
   re-establish the first communication link with the mobile femtocell by operating a fast rollback procedure based on the first communication link related information, after the mobile femtocell and the UE device left the coverage of the adjacent cell,
   wherein the first communication link related information is configured to exclude subscription information of the UE device and capability information of the UE device when the mobile femtocell maintains the subscription information of the UE device and the capability information of the UE device after the first communication link is disconnected.

5. The UE device of claim 4, wherein the re-establishment of the first communication link is triggered in a manner that the mobile femtocell sends a first communication link re-establishment request message to the UE device.

6. The UE device of claim 4, wherein the re-establishment of the first communication link is triggered in a manner that the UE device sends a first communication link re-establishment request message to the mobile femtocell.

* * * * *